March 31, 1970     H. S. SPACIL     3,503,809
ELECTRICAL DEVICE INCLUDING NICKEL-CONTAINING
STABILIZED ZIRCONIA ELECTRODE
Filed Nov. 2, 1967
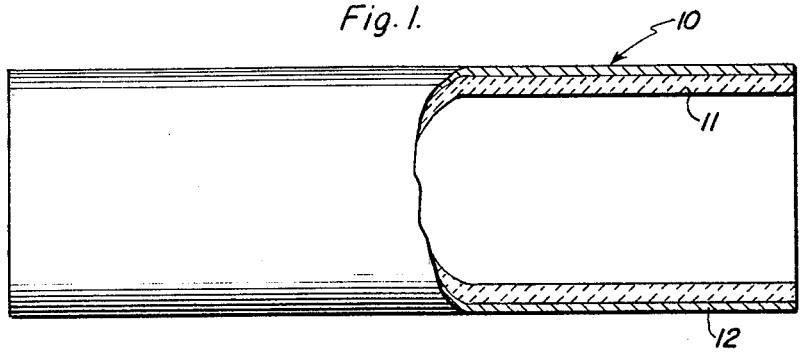
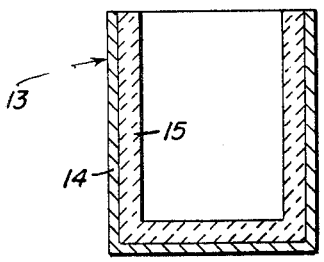
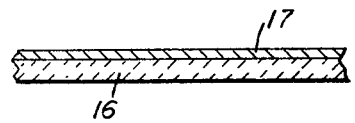
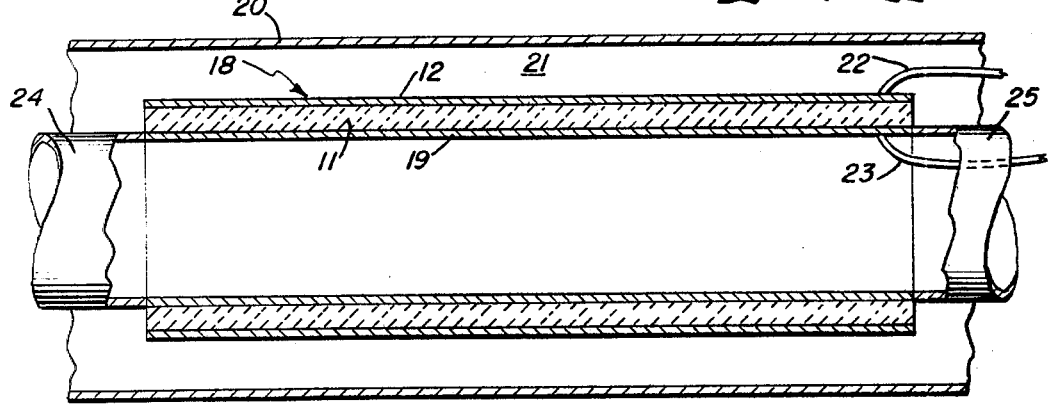
Inventor:
Henry S. Spacil,
by *Leo J. Marlossi*
His Attorney.

United States Patent Office 3,503,809
Patented Mar. 31, 1970

3,503,809
ELECTRICAL DEVICE INCLUDING NICKEL-CONTAINING STABILIZED ZIRCONIA ELECTRODE
Henry S. Spacil, Schenectady, N.Y., assignor to General Electric Company, a corporation of New York
Continuation-in-part of application Ser. No. 407,641, Oct. 30, 1964. This application Nov. 2, 1967, Ser. No. 680,245
Int. Cl. H01v 27/04
U.S. Cl. 136—86         5 Claims

ABSTRACT OF THE DISCLOSURE

Electrode-electrolyte construction for a high temperature electrical device, such as a fuel cell, is described wherein a porous layer containing a mixture of nickel or cobalt particles providing a continuous electrical path in the porous layer and small particles of stabilized zirconia present as a discontinuous phase is firmly bonded to a substrate of stabilized zirconia. The structural interrelationship of the particles in the porous layer wherein the metallic component is the major constituent is responsible for the capability of this particular electrode construction to remain porous during operation at high temperatures for extended periods of time.

---

This application is a continuation-in-part of application Ser. No. 407,641 filed Oct. 30, 1964, now abandoned.

This invention has particular applicability to high temperature electrical devices operated at temperatures over about 600° C. and up to about 1200° C., such as fuel cells, oxygen sensors and oxygen generating equipment. Those devices of prime interest in the practice of this invention employ stabilized zirconia as the electrolyte, electrodes (fuel and oxygen being supplied to the respective electrodes in the case of fuel cell operation) and electrical leads connected to the respective electrodes. By way of example only the description herein will be directed to fuel cell operation.

These fuel cells, such as are shown in U.S. Letters Patent 3,138,487 and 3,138,490 assigned to the assignee of the instant application generate low voltage direct current power on a continuous basis, have application in various chemical process industries, such as in the manufacture of aluminum and in the electro-refining of copper. In addition, the cells can be employed to operate direct current motors.

One of the serious problems faced by the art in the construction of high temperature fuel cell electrodes has been the need to develop a porous, adherent metallic electrode that will remain porous and adherent during operation at high temperatures for extended periods of time. Ordinarily, under the influence of high temperatures (during operation of the device) migration of atomic size defects occurs in such electrodes producing a temperature-dependent sintering action, which in turn causes collapse and densification of the metal particle arrangement responsible for the porous nature of the electrode.

It has been discovered that by increasing the viscosity of the metallic phase under operating conditions, a stiffening thereof is promoted and resistance of the metallic phase to collapse is substantially increased. Anode construction incorporating this mechanism employs a mixture of metal particles selected from the group consisting of nickel and cobalt and particles of stabilized zirconia, the metal particles (a) being large compared to the zirconia particles, (b) constituting over 50 volume percent of the anode and (c) directly contacting adjacent metal particles but leaving three dimensional open paths through the anode with the smaller zirconia particles intimately dispersed as a discontinuous phase between metal particles.

Likewise, it has been discoverd that although nickel oxide-zirconia mixtures meeting the above criteria do not satisfactorily adhere to a stabilized zirconia substrate, lithiated nickel oxide-zirconia mixtures are very adherent to such substrates. Subsequent reduction to produce a nickel-zirconia mixture does not disturb the adherence to the substrate. In the case of cobalt, however, the lithium addition was not required to insure the development of satisfactory lasting adherence between a cobalt oxide-zirconia mixture and the stabilized zirconia substrate by the method described herein.

It is, therefore, a prime object of this invention to provide means incorporated in the electrode construction of a zirconia electrolyte-porous electrode composite to markedly increase the capability of the electrode to retain its porosity at high temperatures.

It is another object of this invention to enable the adherence of a nickel-zirconia deposit to a stabilized zirconia substrate.

These and various other objects, features, and advantages of the invention will be better understood from the following description taken in connection with the accompanying drawing in which:

FIG. 1 is a sectional view of a composite article embodying my invention;

FIG. 2 is a sectional view of a modified composite article;

FIG. 3 is a sectional view of another modified composite article;

FIG. 4 is a sectional view of a high temperature fuel cell embodying the composite article of my invention; and FIG. 5 is a sectional view through the metal particle-zirconia particle anode schematically showing the general manner of particle disposition according to this invention.

In FIG. 1 of the drawing, a composite article is shown generally at 10 which comprises a tubular member 11 of solid stabilized zirconia, and an adherent porous layer 12 on the exterior surface thereof. Layer 12 consists essentially of greater than 50 volume percent of cobalt or nickel particles sintered together with the balance of the volume consisting of an intimate dispersion of very small particles of stabilized zirconia present as a discontinuous phase as is shown schematically in FIG. 5. These volume percentages exclude the porosity of the layer, the connected void content of which may range from 5–30% by volume of the layer.

In FIG. 2 of the drawing, there is shown a modified composite article comprising a container 13 consisting of an adherent porous layer 14 on the exterior surface of stabilized zirconia substrate 15, which layer 14 is of the same material as layer 12 in FIG. 1.

In FIG. 3 of the drawing, there is shown another modified composite article comprising a plate 16 of stabilized zirconia, and an adherent porous layer 17 on one surface thereof, which layer 17 is of the same material as layer 12 in FIG. 1.

In FIG. 4 of the drawing, there is shown a device 18, which may be used, for example, as a high temperature fuel cell. Device 18 embodies the composite article 10 of FIG. 1, which comprises a hollow tubular member 11 of solid stabilized zirconia and porous metal-sintered zirconia layer 12 described hereinabove as the electrolyte and anode, respectively, to which has been added the cathode layer 19 (which may, for example, be of lithiated nickel oxide, or zirconia-silver) on the interior surface of electrolyte 11. It is contemplated that various cathode materials may be employed and the particular material or construction of the cathode forms no part of this improvement. A conduit 20 surrounds and is spaced from anode 12 to provide annular chamber 21.

The location of electrodes 12 and 19 could be interchanged with porous anode 12 being in contact with the interior surface of member 11 and cathode 19 being in contact with the exterior surface of member 11. A lead wire 22 of nickel is attached to layer 12 (the anode), while a lead 23 of some oxidation-resistant metal or alloy is attached to cathode 19. The free ends of leads 22 and 23 would be connected to an electrical load, such as an electric motor for operation thereof by the cell. Conduit 24 is provided for conducting a gaseous oxidant containing molecular oxygen to cathode 19 from a source (not shown). Air and oxygen are examples of typical gaseous oxidants. Conduit 24 communicates with the volume defined by cathode 19. An outlet line 25 communicates with the opposite end of the same volume. A fuel gas, such as hydrogen or carbon monoxide is conducted from a fuel gas source (not shown) into and through annular chamber 21 defined by conduit 20 and porous anode 12. The effluent material, which forms during operation of the cell, is exhausted from the far end of chamber 21 after passage over the outer surface of porous anode 12.

Solid stabilized zirconia is a compound with a cubic crystal structure consisting of zirconia to which has been added calcium oxide, magnesium oxide, yttrium oxide, ytterbium oxide, or a mixture of rare earth oxides. For example, a preferred solid zirconia member employed as an electrolyte is stabilized with 11 molecular percent calcium oxide. Other stabilized zirconias, which may also be employed as solid electrolytes are discussed in "Oxide Ceramics" by Ryshkewitch, Academic Press, 1960, particularly on pages 354, 364 and 376 thereof.

Zirconia may be purchased commercially already stabilized or in a relatively pure state for stabilization (conversion from monoclinic zirconia to cubic zirconia) by the user. Typical analyses of the pre-stabilized and unstabilized zirconias used in the production of this invention are set forth below:

| Pre-stabilized | | Unstabilized | |
|---|---|---|---|
| $ZrO_2$* | 93.94 | $ZrO_2$* | 99.08 |
| $SiO_2$ | 0.62 | $SiO_2$ | 0.18 |
| $Fe_2O_3$ | 0.10 | $CaO$ | 0.22 |
| $TiO_2$ | 0.11 | $MgO$ | 0.15 |
| $CaO$ | 4.80 | $Fe_2O_3$ | 0.10 |
| $MgO$ | 0.25 | $Al_2O_3$ | 0.16 |
| $Al_2O_3$ | 0.18 | $TiO_2$ | 0.11 |
| | 100.00 | | 100.00 |

*Traces of $HfO_2$.

It has been found that the metal (cobalt or nickel) stabilized zirconia porous layer described herein is an electronic conductor which is a very satisfactory anode material, when applied over a substrate of stabilized zirconia serving as the electrolyte. These materials bond well together and are electrically and mechanically compatible whether or not the dispersed stabilized zirconia phase in the anode is, or is not, the same as the stabilized zirconia electrolyte. This electrolyte and this electrode constitute a desirable electrode-electrolyte composite body.

In the preparation of the composite article shown in FIGS. 1, 2 and 3 in the drawing, the solid stabilized zirconia member may be prepared directly from the commercially available pre-stabilized zirconia or from the unstabilized zirconia powder to which has been added calcium oxide (about 11 molecular percent) or other stabilizing agent. The material is formed into a hollow tubular member, a container or a flat plate shown in FIGS. 1, 2 and 3.

A preferred method of forming a porous anode layer consisting of greater than 50 volume percent nickel particles with the balance being an intimate dispersion of a stabilized zirconia as a discontinuous phase, is to initially mix lithium carbonate and nickel oxide in proportions to give ten atomic percent lithium in the metal species (the total of the lithium atoms plus the total of the nickel atoms), and grind the lithium carbonate and nickel oxide in an inert vehicle such as ethanol. The resulting mixture is then dried and calcined in air at 1500° C. for 30 minutes. The calcined oxide shows a black color typical of metal-excess (non-stoichiometric) semiconducting compositions based on nickel oxide. The resulting oxide is then crushed, ground, and passed through a 325 mesh screen. The resulting lithiated nickel oxide powder is mixed with an aqueous slurry of stabilized zirconia of the same type as the zirconia electrolyte in a 4:1 ratio by weight. The particle size of this stabilized zirconia should be less than 10 microns, which is considerably smaller than most of the −325 mesh (about 45 microns) particles of lithiated nickel oxide. The aqueous slurry of stabilized zirconia can be the so-called "slip" used for fabrication of commercial zirconia bodies by slip casting. This 4:1 proportion will provide a material consisting of 70 volume percent of nickel (after most of the lithium is driven off as LiOH and the nickel oxide has been reduced to nickel) and the balance is the fine highly dispersed zirconia. The viscosity of the slurry is adjusted by changing its water content.

The slurry is then painted onto the outer surface of a solid stabilized zirconia member such as the hollow tubular member shown in FIG. 1 of the drawing. An assembly of the solid stabilized zirconia tubular member with the slurry painted thereon is then dried by infrared heating to remove moisture. The assembly is then fired in air at 1550° C. for forty-five minutes, cooled and reheated in hydrogen to 1050° C. over a period of about one hour to convert the lithiated nickel oxide to nickel (most of the lithium is driven off by this treatment leaving a layer consisting predominately of nickel containing the dispersed zirconia phase).

The initial air firing of the assembly causes the lithiated nickel oxide to bond to the stabilized zirconia electrolyte and to sinter into a rather dense, strong layer containing an intimate dispersion of zirconia as a discontinuous phase therein. The subsequent firing of the assembly in hydrogen during which water vapor is formed and driven off produces a layer of porous nickel and some small amount of lithium containing an intimate dispersion of stabilized zirconia. The porosity results from the volumetric decrease of each individual particle associated with the removal of oxygen by the hydrogen. The relationship of these materials after sintering is shown in FIG. 5 wherein the metal particles 26 (cobalt or nickel) are shown as a continuous phase with connected three dimensional open paths interconnecting through the mass of contacting particles 26 extending from interface 27, where the metal-zirconia layer is bonded to the zirconia substrate to the outer surface 28. The smaller dispersed stabilized zirconia particles 29 are out of contact with each other and remain trapped by the larger metal particles retaining the spacing between metal particles during high temperature operation.

In the case of nickel the metal-zirconia layer becomes bonded to the stabilized zirconia substrate through the creation of a "graded seal" of nickel oxide-zirconium oxide, which appears to form when the lithiated nickel oxide is fired on a stabilized zirconia member. This graded seal remains as a transition layer of varying composition extending from the zirconia substrate to the lithiated nickel oxide or, as occurs later nickel, particles.

In the case of either metal (nickel or cobalt) the resultant porous metal layer containing an intimate dispersion of finely divided stabilized zirconia is electronically conductive and adheres well to the solid stabilized zirconia member to provide a composite article. No reliance is placed upon semiconductivity in this electrode construction and the electrical behavior of the nickel is not affected in any way by the escape of lithium atoms from the system during the reduction step and/or during operation.

The same method may be employed with the zirconia members in FIGS. 2 and 3 of the drawing. Either the interior or exterior surface of the container in FIG. 2 or the plate in FIG. 3 is provided with a porous layer of nickel or cobalt containing stabilized zirconia.

In accordance with the above method of forming a porous electrode layer consisting of more than 50 volume percent nickel with the balance being an intimate dispersion of zirconia particles, the nickel metal must be produced by reduction of lithiated nickel oxide. When lithiated nickel oxide is reduced to nickel metal in accordance with the method described, the resultant porous nickel layer is an electronic conductor. If the above method is practiced by mixing similar volume percentages of nickel powder and zirconia and sintering the mixture, the layer produced has been found not to be an electronic conductor. Cobalt, on the contrary, does not have to be introduced in the lithiated state in the formation of cobalt-zirconia layers by this general method.

By densifying and bonding the initial layer to the zirconia electrolyte substrate by sintering a pressure step is eliminated during the sintering step. This facilitates formation of the anode layer in various configurations.

A similar method may be employed for the preparation of a porous cobalt anode except that the lithium component need not be employed. Thus, cobalt oxide (1–10 microns in size) is sintered in air at about 1720° C. for about one hour. The resulting material is crushed and passed through a 325 mesh screen, the maximum particle size of the sintered material passing through the screen being about 45 microns. The resulting screened (−325 mesh) sintered cobalt oxide is mixed in an aqueous slurry of stabilized zirconia (about 1–2 micron size) in 70%–30% proportions (by volume), respectively. A small amount of Carbowax is added and the slurry is applied to the zirconia electrolyte surface. The layer is then sintered in a slightly oxidizing atmosphere (argon plus 2% $CO_2$) at 1300° C. for about 1 hour and then cooled. Subsequent reheating in hydrogen at 1050–1200° C. for about one hour converts the cobalt oxide to cobalt particles in contact with adjacent cobalt particles having interspersed therethrough the collapse-resisting small zirconia particles as a discontinuous phase.

In FIG. 4 of the drawing, a hollow tubular member 11 of solid stabilized zirconia with a porous layer 12 thereon of nickel or cobalt containing an intimate dispersion of solid stabilized zirconia (as shown in FIGS. 1 and 5 of the drawing as composite article 10) is prepared as a composite article in accordance with the above method. Other methods, such as deposition by either plasma spraying or flame spraying, may also be used for preparation of the article in part or in whole. The composite article which is a unitary electrode-electrolyte body is combined with other elements to form a fuel cell 18. An inlet line 24 is provided to communicate with the volume defined by the cathode 19 and to supply an oxidant, such as oxygen, thereto. A fuel gas such as hydrogen or carbon monoxide is supplied to chamber 21 and anode 12 via conduit 20. The oxidation products are removed from chamber 21 via conduit 25. A lead 22 of nickel is attached to anode 12 while a lead 23 of an oxidation-resistant metal or alloy is attached to cathode 19, the free ends of the leads being connected to apparatus (not shown) to be operated by power generated by fuel cell 18.

In the operation of the device 18 shown in FIG. 4 as a fuel cell, heat, such as waste heat, is supplied from a source (not shown) to raise the temperature of electrolyte 11, anode 12 and cathode 19 to a temperature in the range of 800° C. to 1200° C. The cathode 19 is then saturated with oxygen (or a source of oxygen) which is supplied through inlet line 24. The reaction at the cathode-electrolyte interface is as follows:

(1) $$\tfrac{1}{2}O_2 + 2e \rightarrow O^=$$

The oxygen ion moves through electrolyte 11 to the anode-electrolyte interface 27 to combine with either hydrogen in accordance with reaction (2) or to combine with carbon monoxide in accordance with reaction (3)

(2) $$H_2 + O^= \rightarrow H_2O + 2e$$

(3) $$CO + O^= \rightarrow CO_2 + 2e$$

The electrons, which are given up at anode 12 are conducted through lead 22 to apparatus (not shown) for use as electrical power and the oxygen at the cathode 19 combines with electrons returning from the apparatus. The water vapor or carbon dioxide which is generated at anode 12 is released to the atmosphere through outlet line 25.

Composite articles, which are unitary electrode-electrolyte bodies, have been made in accordance with the present invention. Each of these electrode-electrolyte bodies comprised a solid stabilized zirconia substrate with an adherent porous layer thereon, which layer consisted of about 70 volume percent metal particles with the balance being particles of stabilized zirconia dispersed therethrough. The porous layer was prepared either in accordance with the method set forth above or by co-depositing metal oxide particles and stabilized zirconia particles by plasma spraying. A number of these composite articles, which are identified by cell numbers 1–4 in Table I were tested to determine their effectiveness in high temperature fuel cells of which employed in addition a cathode, an oxidant containing molecular oxygen, and a fuel gas of line hydrogen. Each cell was operated at the temperature indicated for several days. Electrical leads were connected to both electrodes and the power generated by the cell was dissipated in a simple decade resistor. Each cell was heated to its operating temperature in a resistance furnace. Cells 1 and 2 employed a lithiated nickel oxide cathode, while cells 3 and 4 were provided with praseodymium cobaltate cathodes as described in U.S. patent application S.N. 645,288—Mitoff, filed June 12, 1967 and assigned to the assignee of the instant application.

TABLE I

| Cell No. | Anode Metal | Temp., °C. | Load voltage (v.) | Current density (ma./cm.²) |
|---|---|---|---|---|
| 1 | Ni | 1,050 | 0.5 | 50 |
| 2 | Ni | 1,200 | 0.5 | 260 |
| 3 | Ni | 1,100 | 0.5 | 1,100 |
| 4 | Co | 1,200 | 0.5 | 1,060 |

While other modifications of this invention and variations of method which may be employed within the scope of the invention have not been described, the invention is intended to include such as may be embraced within the following claims.

What I claim as new and desire to secure by Letters Patent of the United States is:

1. In an electrical device for operation at temperatures in excess of about 600° C., said device comprising a first electrode layer and a second electrode layer separated by and adhered to a layer of stabilized zirconia, the improvement comprising the first electrode layer having as the major constituent thereof by volume a metal selected from the group consisting of nickel and cobalt and the balance consisting essentially of stabilized zirconia, the metal being present in the form of sintered particles disposed as a continuous phase with three-dimensionel paths extending through said first electrode layer and the zirconia in said first electrode layer being present as particles dispersed among the metal particles as a discontinuance phase, whereby said first electrode layer is able to resist collapse of said three dimensionel paths by temperature dependent sintering.

2. The improvement in electrode construction substantially as recited in claim 1 wherein the stabilized zirconia particles dispersed among the metal particles are less than 10 microns in size and the metal particles range in size up to about 45 microns.

3. The improvement in electrode construction substantially as recited in claim 1 wherein the open void content provided by the connected three-dimensional paths ranges from about 5 to about 30 percent of the total volume of the first electrode.

4. The improvement in electrode construction substantially as recited in claim 1 wherein the electrical device is a fuel cell, the first electrode is the anode and the metal particles are nickel.

5. The improvement in electrode construction substantially as recited in claim 4 wherein the first electrode layer is adhered to the layer of stabilized zirconia by a graded seal bond.

References Cited

UNITED STATES PATENTS

| | | | |
|---|---|---|---|
| 3,300,344 | 1/1967 | Bray et al. | 136—86 |
| 3,404,039 | 10/1968 | Mitoff | 136—86 |
| 3,416,967 | 12/1968 | White | 136—86 |

ALLEN B. CURTIS, Primary Examiner

U.S. Cl. X.R.

204—195